Mar. 3, 1925.
J. P. GLASBY
INTERNAL COMBUSTION ENGINE
Filed Aug. 14, 1920  4 Sheets-Sheet 1
1,528,416
Fig.1,
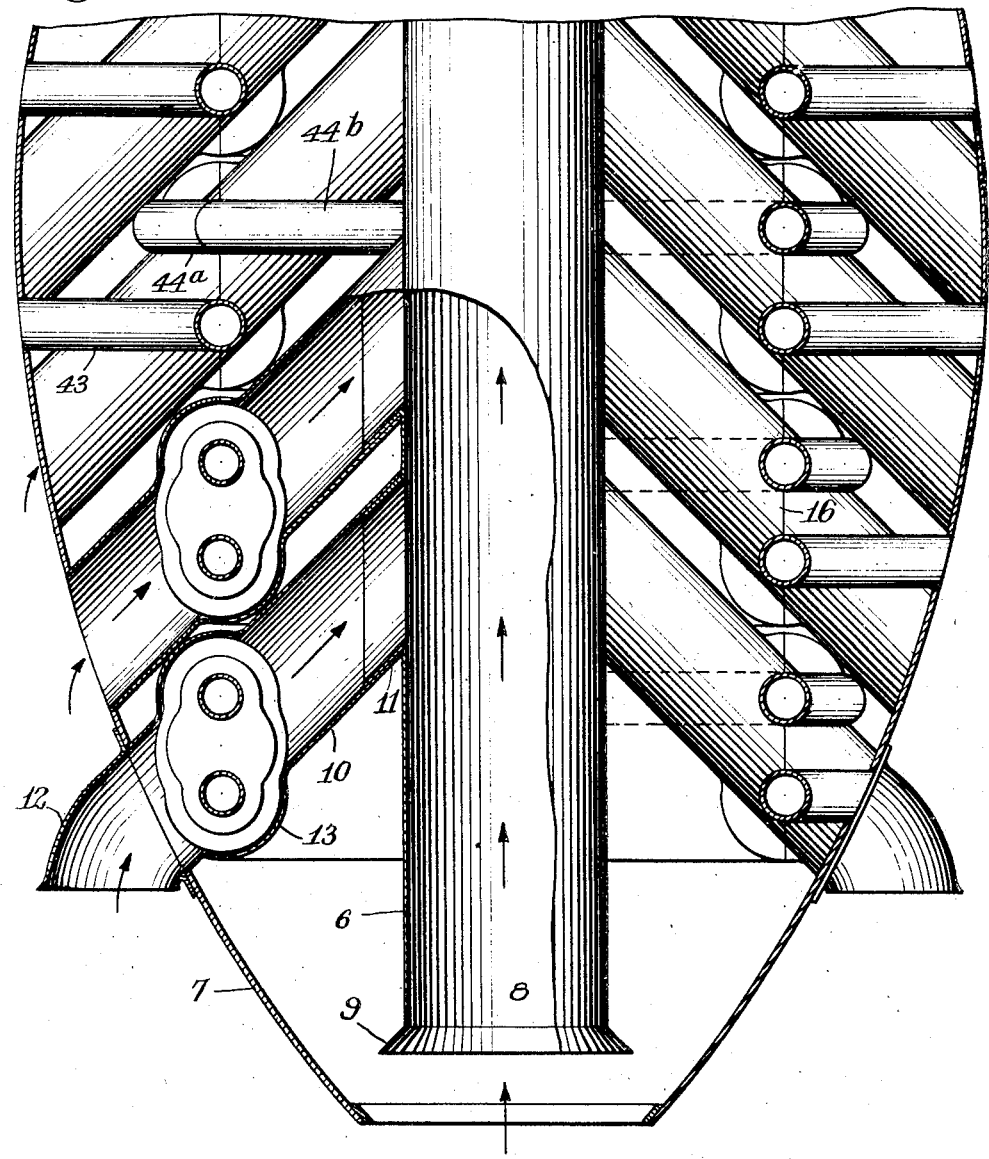
Jonathan P. Glasby, Inventor
By his Attorney
Frederick Griswold

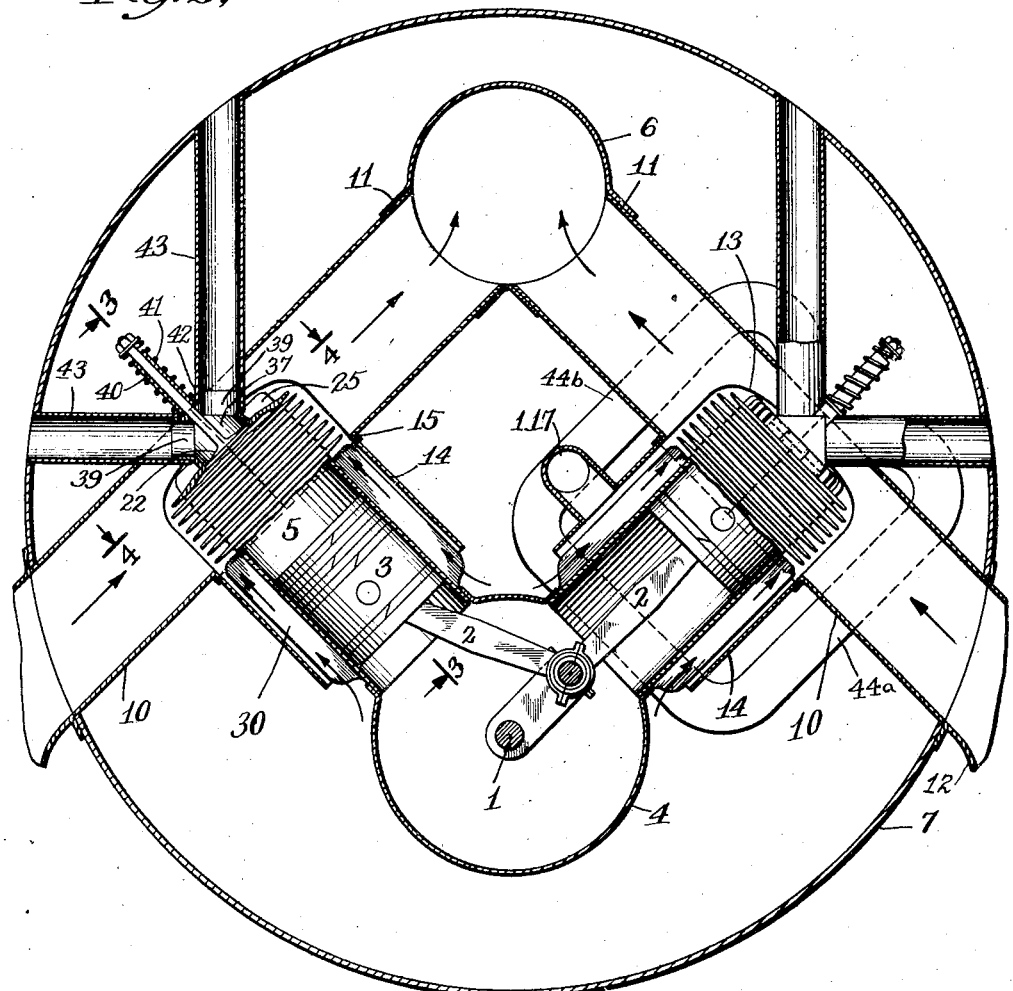

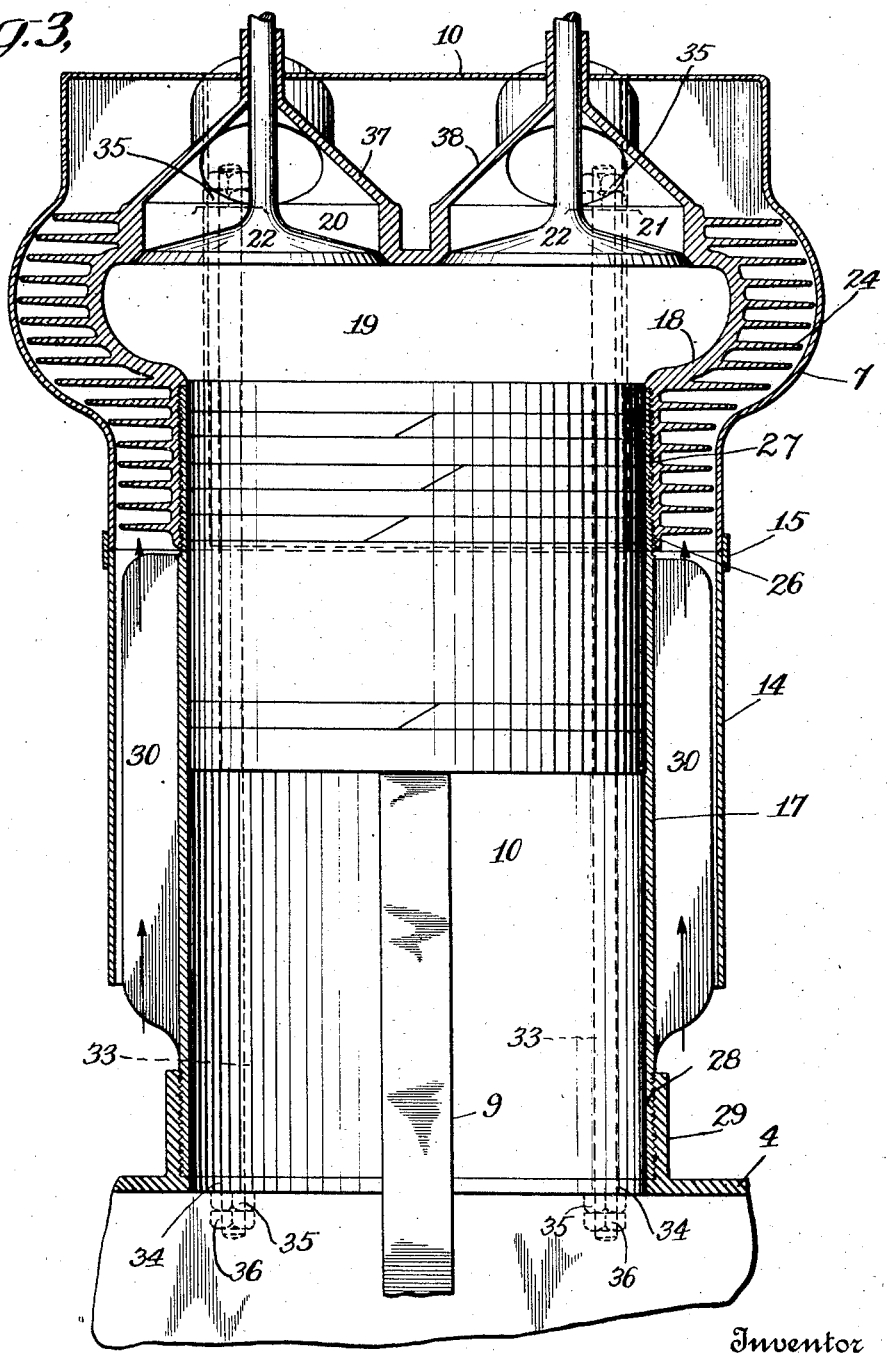

Mar. 3, 1925.　　　　　　　　　　　　　　　　　　1,528,416
J. P. GLASBY
INTERNAL COMBUSTION ENGINE
Filed Aug. 14, 1920　　　　4 Sheets-Sheet 4
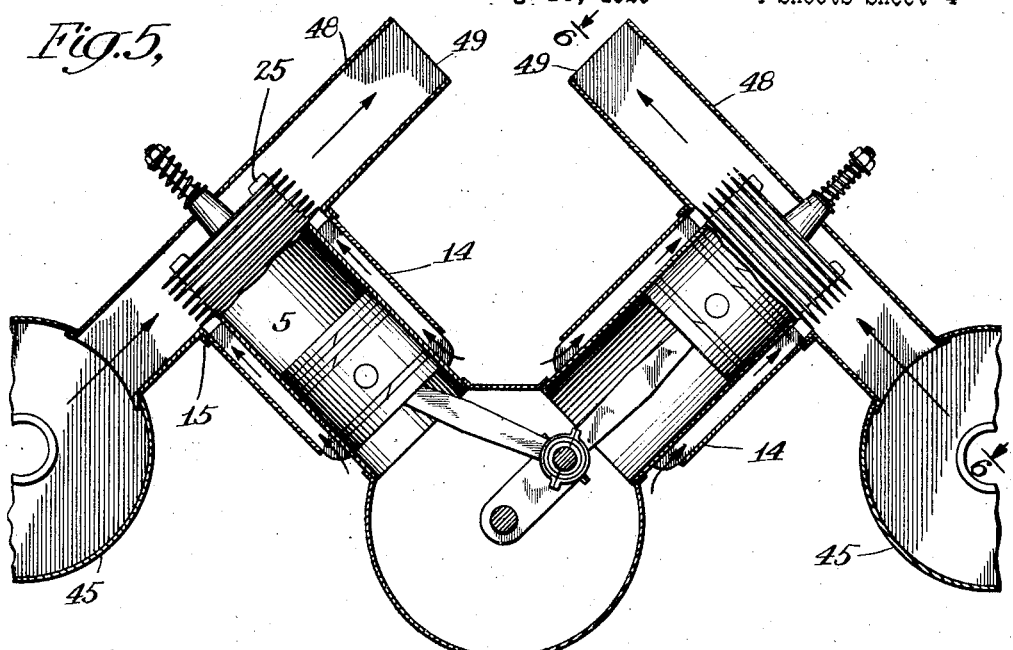
Fig.5,
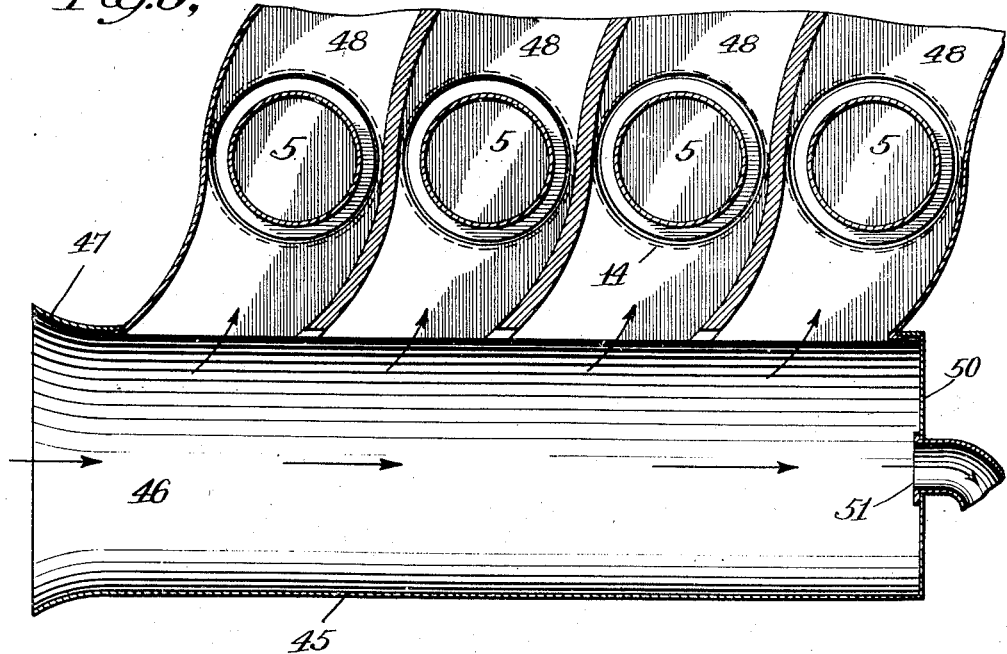
Fig.6,
JONATHAN P. GLASBY, Inventor
By his Attorney
Frederick Griswold.

Patented Mar. 3, 1925.

1,528,416

UNITED STATES PATENT OFFICE.

JONATHAN P. GLASBY, OF EAST ORANGE, NEW JERSEY.

INTERNAL-COMBUSTION ENGINE.

Application filed August 14, 1920. Serial No. 403,555.

*To all whom it may concern:*

Be it known that I, JONATHAN P. GLASBY, a citizen of the United States of America, and resident of East Orange, in the county of Essex and State of New Jersey, have invented certain new and useful Improvements in and Relating to Internal-Combustion Engines, of which the following is a specification.

This invention relates to internal combustion engines and more particularly to aeronautical motors although it is not restricted thereto.

The principal object of my invention is a motor whose cylinders and valves may be simply and efficiently cooled and an improved method of cooling such parts.

In many internal combustion engines and especially in motors used on air craft, it is especially desirable to reduce the weight of the machine to the minimum and therefore a further object of my invention is to provide an engine cylinder adapted to be cooled in the manner hereinafter described, which will combine the maximum strength with the minimum weight.

For the effective operation of an air cooled internal combustion engine it is desirable, if not essential, to permit the engine cylinders to be quickly cleared of the products of combustion and to admit promptly the fresh cool mixture from the carburetor, and a further object of my invention is to provide means for the rapid egress of the products of combustion during the exhausting stroke of the piston and the rapid intake of the fuel during the suction stroke. My numerous experiments have shown that in order to secure the best results, the valve structure of the motor should be modified so as as to cooperate efficiently with the cooling arrangement, and therefore, a further object of the invention is to provide an improved arrangement of inlet and exhaust valves and auxiliary parts which will cooperate most efficiently with the cooling arrangement.

Other features of my invention will be apparent upon an inspection of the accompanying drawings, which illustrate preferred embodiments thereof, wherein:—

Fig. 1 is a top view, partly in section, of my invention; the engine being contained in the forward part of the fuselage of an aeroplane.

Fig. 2 is a sectional view thereof showing certain parts in elevation.

Fig. 3 is a detailed sectional view of one of the cylinders of my motor illustrating the assembly thereof.

Fig. 4 is a top view partly in section showing the intake and exhaust ports and an air conduit and a means for securing the cylinder head.

Fig. 5 is a more or less diagrammatic view, showing a modification of my invention in which the engine is provided with two main air ducts.

Fig. 6 is a more or less diagrammatic sectional view showing the arrangement of the air ducts for one half of my motor as disclosed in Figure 5.

Referring to the drawings wherein like numerals refer to similar parts throughout, I have illustrated my invention as embodied in a motor of the V-type having two banks of cylinders disposed at an angle to each other in the usual manner. I have shown the motor as contained within the forward part of the fuselage of a flying machine.

In the specific embodiment illustrated there are provided two banks of cylinders, four cylinders in each bank, centrally and longitudinally placed within the body of the machine. The engine is shown as comprising crank shaft 1, connecting rods 2, piston 3, crank case 4 and cylinder which I have indicated collectively as 5 provided with intake and exhaust passages which will be discussed more fully hereinafter.

The efficiency of my heat engine is proportional to the power developed from a definite amount of fuel with the least loss of thermal units. In an internal combustion engine there is a great loss of heat from various causes, among which can be cited the reduction of pressure due to excessive cooling of the motor. In a water cooled motor the loss of heat from this source has been determined to be as high as 50%. On the other hand the temperature and pressure in the engine cylinder must be maintained below that which will prematurely cause the ignition of the charge of fuel. I have determined that the cooling of the motor by the passage of a current of fresh cool air constantly crossing the cylinder head of the engine provides the desired cooling temperature.

In carrying out my purpose I provide a main air conduit or passage 6 which I have shown in Figs. 1 and 2 of the drawings as contained within the fuselage of an air craft. The body 7 of the fuselage has been illustrated as tapering to the front and the air passage 6 is shown as located above the engine and longitudinally thereof. The air passage 6 is open to the front at 8 to the atmosphere and is adapted to receive air as the machine moves forward or to receive the slipstream of the propeller should one be located at the front of the machine. I prefer to provide the air conduit 6 with a flaring or funnel shaped mouth 9 in order that the maximum amount of air may be diverted into the passage. The rear end of this air duct is open to the atmosphere and may take any form according to the design of the machine.

The main air passage 6 is provided with branch ducts 10 preferably one for each engine cylinder secured to the main air conduit 6 in any suitable manner at 11 and if desired detachably. I have illustrated these branch ducts 10 as extending in a forward direction and also open to the atmosphere as indicated in Figure 1. The outward ends of these ducts may be provided with extensions or deflectors 12 which serve to deflect the air into the passages 10. One of these deflectors has been shown on each of the forward pair of branch ducts 10, however it is to be understood that all of the branch ducts may be provided with substantially similar deflectors. The ducts 10 are enlarged at 13 to receive the heads of the engine cylinders and may be of any shape to permit a current of air to pass freely about the cylinder head. Surrounding the cylinder 5 is a jacket or casing 14 open at its lower end and communicating with the ducts 10 at 15. The walls of the jacket 14 are at a sufficient distance from the cylinder 5 to permit a generous supply of air to pass therebetween and also to afford sufficient room to provide the cylinder with radiating fins hereinafter more fully described.

The connection 15 between the casing 14 and the branch ducts 10 is preferably a removable connection to permit the separation of the members when it is desired to gain access to the cylinder head. To further facilitate the assembly of the device or to gain access to the cylinder head, the branch ducts 10 may be constructed in sections fastened together by any quickly disengageable means. In the drawings I have illustrated the duct as being divided substantially transversely into two sections, the juncture 16 (Fig. 1) of the sections being located approximately over the center of the cylinder in a line passing through the center of the inlet and exhaust ports, but it is obvious that the ducts may be sectional in other ways, as for instance longitudinally or in three transverse divisions, a joint being formed on either side of the cylinder.

As the machine moves forward air is drawn into the funnel shaped mouth 9 of the main air conduit 6, or is forced therein by the propeller of a tractor type air craft, and travelling through the conduit passes out at the rear end thereof through devices shaped according to the particular design of the vehicle. The air passing through the conduit attains a high velocity which serves to draw with it the air in the branch ducts 10. A partial vacuum is thus created in the branch ducts which is immediately filled by air drawn up between the casing 14 and the cylinder wall 17 and air drawn in through the forward end of the branch ducts. This latter current of air is augmented by the air diverted into the branch ducts by the deflectors 12. It will thus be apparent that all parts of the cylinder are subjected to the cooling action of a current of fresh cool air and that the hottest portion of the cylinder, namely the combustion chamber is adapted to be surrounded by a large quantity of cold air passing over it at a relatively high velocity.

In an air cooled internal combustion engine large valves must be provided to insure rapid expulsion of the flaming exhaust gases and also to admit promptly the fresh cool mixture from the carbureter. Referring now to Figure 3 the motor illustrated comprises a cast metal cylinder head 18 containing the explosion chamber 19 of a size and shape best suited to the needs of the particular engine. I have shown my explosion chamber 19 as having a diameter in one transverse direction greater than the diameter of the cylinder to provide for large intake and exhaust orifices 20 and 21 respectively, located in the head and said combustion chamber is so shaped as to eliminate any pockets or sharp passages which would impede the flow of gas or retain some of the products of combustion and their heat. Intake ports 20 and exhaust ports 21 are controlled by the usual valves 22, 22 and the usual means for their operation, not shown.

I prefer to provide the cylinder head with two diametrically opposed spark plugs 23, 23' (Fig. 4) symmetrically positioned with respect to the intake and exhaust passages. The cylinder head is provided with radiating fins or flanges 24 preferably encircling the same transversely thereof to conduct the heat away from the cylinder head and to provide a greater cooling surface and at the same time permit of unobstructed passage of the cooling medium in the branch air ducts 10. These transverse radiating fins or flanges 24 are located on the cylinder head only within the branch duct 10 and the lowermost fin is positioned sufficiently above the lower portion of said duct to permit the unobstructed flow of the cooling medium from the casing 14 into the branch duct 10. I may also provide the top of the cylinder head with radiating fins or flanges 25 extending in the direction of the duct 10 and may also provide the conduit for the exhaust gases with radiating fins within the air duct, although these provisions are not essential.

That portion of the cylinder head containing the combustion chamber and situated above the piston at the inner end of its stroke called the position of inner dead center, is subjected to the greatest strains due to the expansion of the gases in all directions. As the piston moves downwardly in the cylinder the reaction of the gases is mainly in a direction longitudinal of the cylinder and against the piston head. For this reason the cylinder head is of a weight and thickness to withstand the force exerted by the expanding gases and extends below the piston at its position of inner dead center, to a point below which the force of the expanding gases is mainly longitudinal of the cylinder. The lower end of the cylinder head is illustrated as threaded interiorly thereof at 26. That portion of the engine cylinder below the combustion chamber is subjected to comparatively little strain due to the expanding gases and may therefor be of a lighter construction. I prefer to make this portion of the cylinder as at 17 of steel from a drop forging or a block of steel machined to size, and provided with threads at its upper and lower ends 27 and 28.

The threaded sections 27 and 28 are adapted to engage with the threaded section 26 of the cylinder head 18 and a threaded annular extension 29 on the crank case 4. I prefer to provide the cylinder walls 17 with radiating fins 30 extending longitudinally of the cylinder and serving to conduct the heat away from the cylinder and providing a greater radiating surface which is cooled by a current of air passing between the cylinder 17 and the casing or jacket 14. If desired the fins may be made of such depth as to contact with the inner walls of the casing 14. This will provide for greater heat radiation.

In view of the fact that the engine is made of an assembly of parts, I prefer to provide additional re-enforcing means in order to insure the utmost strength in my machine. To this end I provide lugs or extensions 31 which I have shown as four in number symmetrically placed about the cylinder head, Fig. 4. These lugs or extensions are bored at 32 to receive a rod or bolt 33 (Fig. 3). Corresponding apertures or holes 34 are provided in the crank case outside of the extension 29 adapted to receive the rods 33 which rods are threaded at both ends to receive nuts 35 while lock nuts 36 may also be provided to further secure the same. When the cylinder head is provided with fins, which is the preferable construction, it is obvious that apertures must be provided in the fins corresponding to the apertures in the lugs, for the passage of the rods.

It will thus be seen that I have provided a construction combining the strength requisite in an internal explosion engine of high speed with the minimum weight advantageous in a motor for either aeronautical or other purposes where reduced weight is advantageous, and I have further provided an engine cylinder the interior of which is readily accessible. If for any purpose it is desired to gain access to the interior of the cylinder as for the purpose of removing carbon from the valves or piston head it is only necessary, to remove the branch ducts 10 as hereinbefore described, unscrew the nuts 35, 36 from the upper ends of the rods 33 allowing the rods to be dropped a short distance into the crank case until their upper ends clear the lowermost circumferential fin, and then unscrew the cylinder head 18 from the cylinder walls 17 thus exposing the top of the piston and the interior of the explosion chamber.

It will be appreciated that the advantages derived from the provision of large valves would be nullified if no provision were made for immediately removing the extremely hot and possibly flaming exhaust gases from heat transmitting proximity to the engine cylinder head, and it is also important to fill the combustion chamber with the new cool mixture as rapidly as possible and to this end I increase the area of the intake and exhaust passages leading into the engine cylinder. The orifices 20, 21 in the head of the cylinder are shown as of increased size and positioned in the head of the cylinder. Valves 22 actuated by the usual devices, not shown, are adapted to control these orifices and a branched section 37 is shown secured to the exhaust outlet 20 and a branched section 38 is shown as secured to the intake orifice 21 secured thereto in any known manner. The sections 37 and 38 are provided with two branches 39, 39. The stem of valve 22 is shown as passing through the sections 37, 38 at a point between the two branch outlets 39, 39. The section may serve as a guide for the valve stem and may have a tubular extension 40 to further aid in guiding it. I prefer to cast the cylinder head 18 and the members 37 and 38 in one piece. In this way I am enabled to bore the guide for the valve stem to insure the perfect seating of the valve.

The spring 41 serving to maintain the valve in its seated position may surround the extension 40 and suitable devices 42 positioned on the extension are provided as an abutment to support one end of the spring. Conduits 43—43 are shown secured in any suitable manner to the branches 39, 39 of the member 37 and preferably so arranged as to be readily disengageable therefrom. These conduits are open to the atmosphere and afford a short path for the products of combustion exhausted from the engine cylinder. Conduits 44ᵃ—44ᵇ for the passage of the incoming mixture are shown attached to the branches 39—39 of the member 38. These conduits are shown as extending over the top of the branch duct 10 and down along the sides of the cylinders to a manifold or carburetor 117. This is preferably located on the inner side of the cylinders and the conduit 44ᵃ situated on the outer side of the cylinder is curved to lead between the cylinders to the manifold or carbureter. At the point where the conduit passes between the casings surrounding the cylinder it is flattened in a horizontal direction and extended in a vertical direction to permit the same transverse area to be maintained. The member 37 and the conduits 43 for the exhaust gases may be provided with radiating fins thus affording additional cooling means for the exhaust gases.

It is thus apparent that I have provided two passages for the passage of the gases, the combined area of which is greatly in excess of the usual intake or exhaust passages.

The cylinder head of an internal combustion engine is subjected to the greatest heating and it will be observed that I have provided means whereby a constant stream of relatively cold air is passed over the cylinder head. Obviously, the greater the quantity of air passing over the cylinder head in a unit of time the more efficacious will be the cooling of the same and under certain circumstances, I prefer to provide two main air ducts 45, 45 as illustrated in Fig. 5. These main air ducts 45, 45 are placed longitudinally of the motor, one on either side thereof, the total quantity of air entering the duct as the machine moves forward, is available for cooling the cylinders of the one bank. Being further from the axis of the propeller in the case of a flying machine a relatively larger quantity of air would be forced into the duct under the influence of the propeller. The forward end 46 of the duct 45 is shown as flaring or funnel shaped at 47. Branch ducts 48 are provided for each of the cylinders 5. The ducts 48 extend in an upwardly and rearwardly direction, are open to the atmosphere at the rear end thereof, and include the cylinder heads as hereinbefore described.

The cylinders are provided with casings 14 or jackets 14 open at the lower end and communicating with the branch ducts at their upper ends. The cooling medium entering the main duct 45 is forced into the branch ducts where it flows over the cylinder head and out at the rear end 49 of the duct. The air in its passage through the branch ducts siphons up air through the casing surrounding the cylinders in all respects similar to the method hereinbefore described.

The rear end of this main air duct is closed at 50 and is provided with a small outlet 51, which may lead to the carburetor of the engine. It will be readily seen that the air will become progressively denser toward the rear of this conduit 45 when the machine is in motion and this densified air may be advantageously used for mixing with the fuel for combustion in the engine cylinders in a rarefied atmosphere. By directing the exit end of the branch ducts toward the rear an additional suction is created in the branch ducts as the machine moves forward which greatly increases the velocity of the air passing through the ducts 48.

The terms and expressions employed are used as terms of description and not of limitation, and I have no intention in using such terms and expressions to include any equivalents of the features shown and described, or portions thereof, but recognize that various modifications in the apparatus are possible within the scope of the invention claimed.

What I claim is:

1. An internal combustion engine comprising a main air conduit, a section of a duct detachably secured thereto, another section of said duct detachably secured to said first section, a cylinder projecting within said sectional duct at the juncture of the two sections, and a jacket surrounding said cylinder removably secured to said sectional duct.

2. In a V-type multi-cylinder internal combustion engine, in combination with the cylinders whereof the respective heads have intake and exhaust valves, of individual air passages enclosing the cylinder heads respectively, and a common air passage opening directly into the atmosphere disposed between the respective banks of cylinders, said individual air passages being open at their respective intake ends directly into the atmosphere and leading respectively into the common air passage.

3. In a V-type multi-cylinder internal combustion engine, in combination with the cylinders whereof the respective heads have intake and exhaust valves, of individual air passages enclosing the cylinder heads respectively, a common air passage opening directly into the atmosphere disposed between the respective banks of cylinders, said individual air passages being open at their respective intake ends directly into the atmosphere and leading respectively into the common air passage and air deflectors for the intake ends of the individual air passages.

4. In a V-type multi-cylinder internal combustion engine, in combination with the cylinders whereof the respective heads have intake and exhaust valves, of individual air passages enclosing the cylinder heads respectively, casings surrounding said cylinders respectively and open at their lower ends to the atmosphere and connected at their upper ends to the individual passages, a common air passage opening directly into the atmosphere disposed between the respective banks of cylinders, said individual air passages being open, at their respective intake ends, directly into the atmosphere and leading respectively into the common air passage and air deflectors for the intake ends of the individual air passages.

5. The combination with the fuselage of an airplane and a multi-cylinder internal combustion engine having cylinder heads provided with valves carried therewith and a propeller disposed in the median line of the fuselage, of individual air passages enclosing the cylinder heads respectively, means to receive the slip stream of the propeller and direct it into the individual air passages, and means for conducting the air in the individual air passages out of the fuselage directly into the atmosphere.

6. In a V-type multi-cylinder internal combustion engine, in combination with the cylinders whereof the respective heads have intake and exhaust valves, of individual air passages enclosing the cylinder heads, respectively, a common air passage opening directly into the atmosphere disposed between the respective banks of cylinders, said individual air passages being open at their respective intake ends directly into the atmosphere and leading respectively into the common air passage, and means to induce a flow of air in the passages.

7. The combination with a V-type multi-cylinder internal combustion engine having cylinder heads provided with valves and a housing for said engine, of individual air passages, enclosing the cylinder heads, respectively, extending through the housing and opening directly into the atmosphere and means for conducting the air in the individual air passages out of the housing directly into the atmosphere.

8. The combination with a V-type multi-cylinder internal combustion engine having cylinder heads provided with valves and a housing therefore, of individual air passages enclosing the cylinder heads, respectively, and a common air passage opening directly into the atmosphere through the housing and disposed between the respective banks of cylinders, said individual air passages being open at their respective intake ends through the housing directly into the atmosphere, and leading respectively into the common air passage.

9. The combination with a V-type multi-cylinder internal combustion engine having cylinder heads provided with valves and a housing therefore, of individual air passages enclosing the cylinder heads, respectively, and a common air passage opening directly into the atmosphere through the housing and disposed between the respective banks of cylinders, said individual air passages being open at their respective intake ends through the housing directly into the atmosphere and leading respectively into the common air passage, and means to induce a flow of air in the passages.

Signed at New York, in the county of New York and State of New York this 13th day of August, A. D. 1920.

JONATHAN P. GLASBY.